(12) United States Patent
Jeon et al.

(10) Patent No.: US 12,281,262 B2
(45) Date of Patent: Apr. 22, 2025

(54) METHOD OF PREPARING HEAVY OIL-DERIVED ANISOTROPIC PITCH FOR CARBON FIBER BASED ON MESOGEN SEPARATION

(71) Applicant: KOREA RESEARCH INSTITUTE OF CHEMICAL TECHNOLOGY, Daejeon (KR)

(72) Inventors: Young-Pyo Jeon, Daejeon (KR); Seung Hyun Ko, Daejeon (KR); Seung Jae Ha, Daejeon (KR); Min Seong Jo, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 712 days.

(21) Appl. No.: 17/452,881

(22) Filed: Oct. 29, 2021

(65) Prior Publication Data
US 2022/0135884 A1    May 5, 2022

(30) Foreign Application Priority Data
Nov. 2, 2020   (KR) .......................... 10-2020-0144537

(51) Int. Cl.
*C10C 3/14* (2006.01)
*C01B 32/05* (2017.01)
(Continued)

(52) U.S. Cl.
CPC ................ *C10C 3/14* (2013.01); *C01B 32/05* (2017.08); *C08L 95/00* (2013.01); *C10C 3/00* (2013.01);
(Continued)

(58) Field of Classification Search
None
See application file for complete search history.

(56) References Cited

U.S. PATENT DOCUMENTS

| | | | |
|---|---|---|---|
| 4,005,183 A | 1/1977 | Singer | |
| 4,317,809 A | 3/1982 | Lewis et al. | |
| | (Continued) | | |

FOREIGN PATENT DOCUMENTS

| | | |
|---|---|---|
| JP | 60-045612 A | 3/1985 |
| JP | 61-238885 A | 10/1986 |
| | (Continued) | |

OTHER PUBLICATIONS

English machine translation of Kishimoto et al. (JP-2018031098-A) accessed online from Espacenet; PDF pp. 1-35. (Year: 2018).*

(Continued)

*Primary Examiner* — Katie L. Hammer
(74) *Attorney, Agent, or Firm* — Womble Bond Dickinson (US) LLP

(57) ABSTRACT

The present disclosure relates to a method of preparing an anisotropic pitch for carbon fiber, and more particularly, to a method of preparing an anisotropic pitch of preparing a pitch having a low softening point by thermally polymerizing heavy oil or residue oil generated in an oil refining process, extracting only a mesogen component, and then heat-treating at a high temperature for a short time. The anisotropic pitch prepared in the present disclosure has advantages of exhibiting the anisotropic content of 100% and controlling the anisotropic content only a simple temperature control as desired and may be used as a precursor of a high value-added carbon material such as carbon fiber and an anode material for a lithium secondary battery.

13 Claims, 4 Drawing Sheets

(51) Int. Cl.

| | |
|---|---|
| *C08L 95/00* | (2006.01) |
| *C10C 3/00* | (2006.01) |
| *C10C 3/08* | (2006.01) |
| *D01F 9/145* | (2006.01) |
| *D01F 9/155* | (2006.01) |
| *H01M 4/02* | (2006.01) |
| *H01M 4/587* | (2010.01) |
| *H01M 10/0525* | (2010.01) |

(52) U.S. Cl.
CPC ............ *C10C 3/002* (2013.01); *C10C 3/08* (2013.01); *D01F 9/145* (2013.01); *D01F 9/155* (2013.01); *H01M 4/587* (2013.01); *H01M 10/0525* (2013.01); *H01M 2004/027* (2013.01); *Y02E 60/10* (2013.01)

(56) References Cited

U.S. PATENT DOCUMENTS

| | | | | |
|---|---|---|---|---|
| 4,589,974 | A | * | 5/1986 | Izumi ............... D01F 9/145 208/22 |
| 4,820,401 | A | | 4/1989 | Tsuchitani et al. |
| 4,925,547 | A | * | 5/1990 | Tsuchitani ............ C10C 3/00 208/45 |
| 5,259,947 | A | | 11/1993 | Kalback et al. |
| 5,437,780 | A | | 8/1995 | Southard et al. |
| 5,538,621 | A | | 7/1996 | Kalback et al. |
| 5,540,832 | A | | 7/1996 | Romino |
| 5,540,903 | A | | 7/1996 | Romine |
| 7,018,526 | B1 | * | 3/2006 | Isayev ............... D01F 9/155 208/43 |

FOREIGN PATENT DOCUMENTS

| | | | | |
|---|---|---|---|---|
| JP | 01-110593 | A | | 4/1989 |
| JP | 01308815 | A | * | 12/1989 |
| JP | 1997-048978 | A | | 2/1997 |
| JP | 09048978 | A | | 2/1997 |
| JP | 2997060 | B2 | | 1/2000 |
| JP | 3051155 | B2 | | 6/2000 |
| JP | 2002-121569 | A | | 4/2002 |
| JP | 3609406 | B2 | | 1/2005 |
| JP | 2018031098 | A | * | 3/2018 |
| KR | 10-0068337 | B | | 6/1993 |
| KR | 1993-0005525 | B1 | | 6/1993 |
| KR | 10-1996-022953 | | | 7/1996 |
| KR | 10-2000-0037401 | A1 | | 7/2000 |
| KR | 10-2014-0092435 | A | | 7/2014 |
| KR | 10-1651945 | B1 | | 8/2016 |
| KR | 10-1961808 | B1 | | 3/2019 |
| KR | 10-1966886 | B1 | | 4/2019 |

OTHER PUBLICATIONS

English machine translation of Iwahashi et al. (JP-01308815-A) accessed online from Espacenet, PDF pp. 1-4. (Year: 1989).*
Korean Notice of Allowance for Application No. KR 9-5-2022-088898854, dated Nov. 16, 2022, 7 pages.
Korean Office Action for corresponding Korean application No. 10-2020-0144537, dated May 23, 2022 with English translation.
Park, Yang Duk et al.; "A Two-Stage Preparation of Mesophase Pitch from the Vacuum Residue of FCC Decant Oil"; Carbon; vol. 27; No. 6; 1989; pp. 925-929.
Singer, Leonard S.; "Carbon fibres from mesophase pitch"; Fuel; vol. 60; Sep. 1981; pp. 839-847.
Kim, Cheol-Joong et al.; "Phase Separation of Mesophase Pitch by a High-Temperature Centrifugal Method"; Hwahak Konghak; vol. 31; No. 1; Feb. 1993; pp. 1-8; (English Abstract).

* cited by examiner

METHOD OF PREPARING HEAVY OIL-DERIVED ANISOTROPIC PITCH FOR CARBON FIBER BASED ON MESOGEN SEPARATION

CROSS-REFERENCE TO RELATED APPLICATIONS

This application claims priority to Korean Patent Application No. 10-2020-0144537 filed on Nov. 2, 2020, and all the benefits accruing therefrom under 35 U.S.C. § 119, the contents of which is incorporated by reference in its entirely.

BACKGROUND OF THE INVENTION

Field of the Invention

The present disclosure relates to a method of preparing a heavy oil-derived anisotropic pitch for carbon fiber based on mesogen separation, and more particularly, to a method of preparing an anisotropic pitch for carbon fiber having a high anisotropic content and a low softening point from petroleum heavy oil or petroleum residual oil, an anisotropic pitch for carbon fiber prepared by the method, and carbon materials including the anisotropic pitch.

Description of the Related Art

Studies on petroleum heavy oil have been conducted as a raw material of various carbon or graphite materials including carbon fiber due to high aromaticity and a low heterogeneous element content such as sulfur and nitrogen. In addition, since the price thereof is cheap, there are also great expectations for the cost savings and creation of high added value when the corresponding material is applied.

The heavy oil has a very low solid impurity content called quinoline insoluble unlike coal-tar, a coal-based heavy oil, and thus has an advantage of using it without having a purification process.

As an intermediate step for a carbon/graphite material manufactured from the heavy oil, generally, there is a precursor material called a pitch, and the pitch is a solid at room temperature, but is melted at a temperature of a softening point or higher due to a thermoplastic property to have a liquid behavior.

With the aid of its thermoplastic property, pitch can be thermally processed into diverse shaped materials, and as a representative example, the molten pitch is extruded through a micrometer sized orifices in a spinnerette to become an as-spun fiber for carbon fiber manufacturing.

In general, the pitch is divided into isotropic and anisotropic pitches according to the optical characteristics. The division of these pitches has a great influence to determine the physical properties of the carbon material manufactured from the pitches.

In the case of carbon fibers, pitch-based carbon fibers prepared from the anisotropic pitch are used as a premium-grade material due to the characteristics of high strength, high elasticity, and high thermal conductivity.

However, pitch-based carbon fibers prepared from the isotropic pitch are utilized as a material of a general-purpose grade due to low strength, low elasticity, and low thermal conductivity.

As general methods for preparing the anisotropic pitch from heavy oil, the following three methods have been known.

① Nitrogen bubbling dry distillation method (U.S. Pat. No. 4,005,183, issued on Jan. 25, 1977)

As a method of preparing an anisotropic pitch by heating and stirring heavy oil at a temperature of about 400° C. and blowing excessive nitrogen gas into the heavy oil at a fast rate, polycondensation reaction between aromatic molecules occur due to the thermal energy and as a result, a mesogen component (polycyclic aromatic molecules with high molecular weight capable of forming an anisotropic phase) is produced.

At this time, a low molecular weight component (non-mesogen) that is not grown into mesogen interferes with the formation of the anisotropic phase of the mesogen molecules, and such a non-mesogen component is removed by nitrogen separation, and as a result, the mesogen is concentrated and the interaction therebetween is enabled to obtain an anisotropic phase.

However, in this method, nitrogen is severely consumed, and a molecular weight range that can be removed by nitrogen separation is not high, and thus it is not suitable for obtaining an anisotropic content of 80% or more. In addition, since it is necessary to be treated for a long time at a high temperature, overreaction control is difficult and thus there is a problem that a large amount of infusible particles are made.

These infusible particles cause the frequent breakage of fiber in a spinning process for preparing carbon fiber and remain in the final fiber to cause deterioration of physical properties.

② Vacuum distillation method (Carbon Vol. 27, No 6, pp 925-929, 1989)

The vacuum distillation method is a method derived to overcome the limits of the nitrogen separation method, and a method of removing a low molecular weight component (non-mesogen) as a vacuum distillation effect other than fast nitrogen separation.

As compared with the nitrogen separation method, there is an advantage of shortening a high temperature processing time and removing a higher molecular weight component.

However, the non-mesogen component present in the isotropic pitch has a molecular weight region of approximately 200 to 400 g/mol, and still, there are many components that are hardly removed even by vacuum distillation.

As a result, it is not easy to completely remove the non-mesogen component, and it is difficult to achieve a high anisotropic content of 90% or more through a vacuum distillation method.

In addition, in order to maximize the vacuum distillation effect, it is necessary to increase the temperature and decrease the pressure as much as possible.

However, since a high process temperature causes pyrolysis and overreaction, it is difficult to increase the temperature of 400° C. or higher and a very low reduced pressure of 1 hPa or less is required, but it is very difficult to implement the reduced pressure in an actual process, so that it was not commercialized.

③ High temperature centrifuge method (Korean Chem. Eng. Res., Vol 31, pp 1-8, 1993)

Before a vacuum distillation step, in a thermal polymerization step, $N_2$ is added at a fully fast rate and if the thermal polymerization time is sufficiently long, the formation of an anisotropic pitch is partially performed.

As the resulting pitch, a mixed-phase pitch in which isotropic and anisotropic phases are mixed is obtained, and the two phases have a density difference within 0.1 g/cm$^3$ in a molten state and a phase separation is performed using the density difference, which is the high temperature centrifuge method.

For the phase separation, the high-speed centrifuge needs to be performed after rising to a temperature of 300 to 400° C. of a pitch softening point or higher. The anisotropic pitch obtained through this has an advantage that since it is easy to suppress overreaction, the quality is high as compared with vacuum distillation, but it is difficult to implement high-speed centrifugation at a high temperature and thus commercialization did not succeed.

The above-described technical configuration is the background art for helping in the understanding of the present invention, and does not mean a conventional technology widely known in the art to which the present invention pertains.

SUMMARY OF THE INVENTION

The present inventors have conducted studies for solving the problems that as described above, by a conventional known method of preparing an anisotropic pitch, it was very difficult to manufacture a high-purity anisotropic pitch of 90% or more from heavy oil, and in particular, it is almost impossible to prepare a 100% ultra-high purity anisotropic pitch, and in addition, conditions for increasing the anisotropic content were very complicated and strict, so that it was difficult to be applied to mass production. As a result, the present inventors found that it is possible to prepare a heavy oil-derived anisotropic pitch for carbon fiber based on mesogen separation, and completed the present disclosure.

Therefore, an object of the present disclosure is to provide a method of preparing an anisotropic pitch for carbon fiber having a high anisotropic content and a low softening point from petroleum heavy oil.

Another object of the present disclosure is to provide an anisotropic pitch for carbon fiber having a high anisotropic content and a low softening point by being prepared by the method.

Yet another object of the present disclosure is to provide a carbon material including the anisotropic pitch.

A first embodiment of the present disclosure to achieve the objects provides a method of preparing an anisotropic pitch for carbon fiber comprising the steps of: (a) obtaining a primary pitch by thermally polymerizing heavy oil;

(b) grinding and classifying the obtained primary pitch;

(c) solvent-extracting, filtering, and drying the classified primary pitch to adjust a ratio of mesogen to non-mesogen in the pitch; and (d) changing the dried pitch to an anisotropic phase by heat-treatment.

The thermal polymerization may be performed under conditions of a reaction temperature of 350° C. to 500° C., a reaction time of 10 minutes to 10 hours, and an inert gas flow rate of 1,000 ml/min/kg or less.

The inert gas flow rate may be 500 ml/min/kg or less.

A softening point of the primary pitch obtained through the thermal polymerization may be 50° C. to 200° C., and the anisotropic content may be 40% or less.

An average particle size of the ground product obtained by grinding in step (b) may be 0.1 μm to 500 μm.

The average particle size of the ground product may be 1.0 μm to 250 μm.

The solvent used in the solvent extraction may be acetone or a combination of acetone and an organic solvent except for the acetone.

In the solvent extraction step, a weight ratio of the primary pitch to the solvent may be 1:5 to 1:50.

The weight ratio of the primary pitch to the solvent may be 1:10 to 1:20.

A molar ratio of mesogen to non-mesogen of the pitch obtained through the solvent extraction may be 80:20 to 95:5.

The heat-treatment of step (d) may be performed under conditions of a heat-treatment temperature of 300° C. to 450° C. and a heat-treatment time of 1 minute to 30 minutes.

The heat-treatment time may be 1 minute to 10 minutes.

The softening point of the anisotropic pitch obtained in step (d) may be 330° C. or less.

The anisotropic content of the anisotropic pitch obtained by step (d) may be 80% to 100%.

A second embodiment of the present disclosure to achieve the objects provides an anisotropic pitch for carbon fiber prepared by the method.

The softening point of the anisotropic pitch obtained may be 330° C. or less.

The anisotropic content of the anisotropic pitch may be 80% to 100%.

A third embodiment of the present disclosure to achieve the objects provides a carbon material comprising the anisotropic pitch.

The carbon material may be carbon fiber.

The carbon material may be an anode material for a lithium secondary battery.

According to the present disclosure, the anisotropic pitch prepared by the preparation method of the present disclosure has a maximum 100% anisotropic content and a low softening point of 330° C. or less, and thus has an advantage of adjusting the anisotropic content to a desired content by controlling a phase transition temperature as well as being usable as a precursor of premium grade pitch-based carbon fiber.

Further, the current method has the advantages of being easily applied to mass production due to mild process conditions and simple manufacturing procedures.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
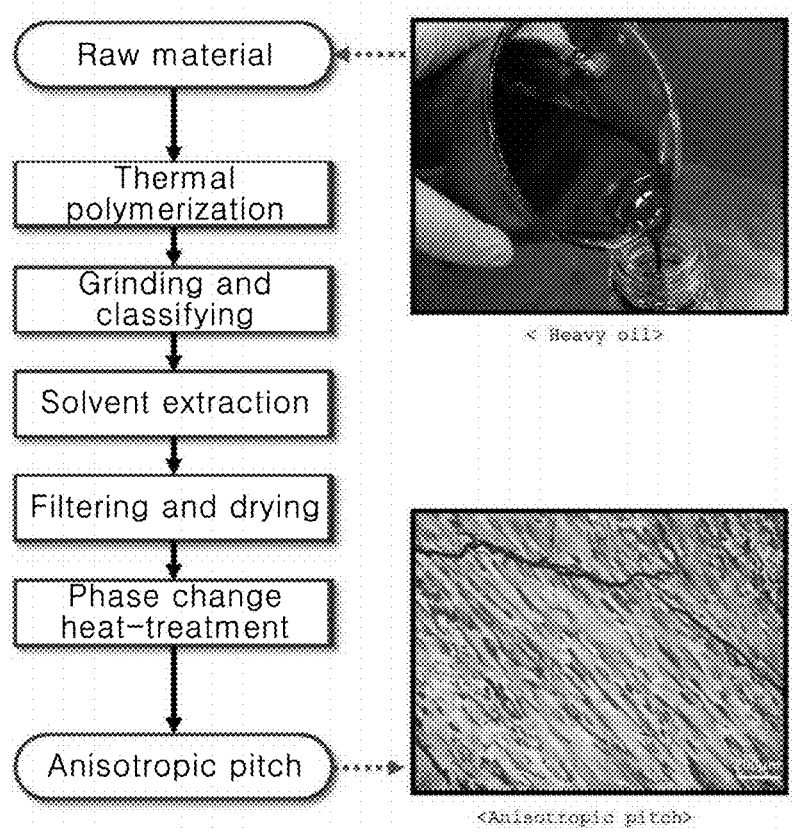
FIG. 1 illustrates a preparation process diagram sequentially illustrating steps of preparing an anisotropic pitch from heavy oil according to an embodiment of the present disclosure.

In the following description, only parts required to understand embodiments of the present disclosure will be described, and it should be noted that the description of other parts will be omitted within a range without departing from the gist of the present disclosure.

Terms and words used in the present specification and claims should not be interpreted as being limited to typical or dictionary meanings, but should be interpreted as meanings and concepts which comply with the technical spirit of the present disclosure, based on the principle that the present inventor can appropriately define the concepts of the terms to describe his/her own invention in the best manner.

Therefore, the exemplary embodiments described in the present specification and the configurations illustrated in the drawings are merely the most preferred embodiment of the present disclosure and are not intended to represent all of the technical ideas of the present disclosure, and thus, it should be understood that various equivalents and modifications capable of replacing the exemplary embodiments at the time of this application.

Hereinafter, a method of preparing a high-purity anisotropic pitch according to the present disclosure will be described in detail.

A method of preparing an anisotropic pitch for carbon fiber according to a first embodiment of the present disclosure includes the steps of (a) obtaining a primary pitch by thermally polymerizing heavy oil; (b) grinding and classifying the obtained primary pitch; (c) solvent-extracting, filtering, and drying the classified primary pitch to adjust a ratio of mesogen to non-mesogen in the pitch; and (d) changing the dried pitch to an anisotropic phase by heat-treatment. A series of processes are illustrated in FIG. 1.

Hereinafter, the present disclosure will be described in more detail.

(1) Raw Material

Heavy oil (or residue oil) as a raw material is oil as a byproduct in a crude oil purification process (oil refining process), and may be at least one selected from the group consisting of fluidized catalytic cracking-slurry oil (FCC-slurry oil), fluidized catalytic cracking-decant oil (FCC-DO), pyrolysis fuel oil (PFO), ethylene bottom oil (EBO), and de-asphalted oil (DAO).

These raw materials have high aromaticity, a low heterogeneous element content such as sulfur or nitrogen, oxygen, etc., and a very low particle content of a solid called a quinoline insoluble to be suitable for preparation of the anisotropic pitch. Coal-tar, which is obtained as a by-product of a coal carbonization process, can be used as a raw material after removing the quinoline insoluble.

(2) Thermal Polymerization

The thermal polymerization according to the present disclosure is a step of inducing a thermal polymerization reaction by heating a raw material and partially removing low-boiling point components, and under an inert atmosphere, the raw material is heated to a constant temperature and then maintained at the corresponding temperature for a certain time.

By the thermal polymerization reaction, a large amount of high molecular weight polycyclic aromatic compounds are made, and the high molecular weight polycyclic aromatic compounds serve as a mesogen component forming the anisotropic pitch.

The remaining low molecular weight components that do not participate in the thermal polymerization reaction are non-mesogen components and do not contribute to the formation of the anisotropic phase. Some of these components are removed by an evaporation effect during thermal polymerization, but most of these components remain to suppress the formation of the anisotropic phase of the mesogen components.

The temperature suitable for inducing the thermal polymerization reaction is 350° C. to 500° C. In the case of 350° C. or less, the polymerization reaction is performed at a very slow rate, and in the case of 500° C. or higher, the reaction rate is excessively faster and a large amount of coke particles are generated beyond a pitch state.

These coke particles have a thermosetting property unlike the pitch to lose the softening property, and as a result, become impurities without serving as a precursor.

The reaction time is preferably 10 minutes to 10 hours, and the reaction time of 10 minutes or less may cause a serious yield reduction in a sufficient reaction. On the contrary, the reaction time of 10 hours or more may induce excessive reaction to cause the pitch coking.

At this time, the stirring may be performed for uniform heat transfer of the pitch, and the form of a stirrer and a stirring speed are not limited.

In addition, the inert gas flows in throughout the thermal polymerization step to block the reaction with oxygen, and the type of inert gas used at this time may be performed using gas selected from the group consisting of nitrogen, argon, and helium. Preferably, the thermal polymerization may be performed under a nitrogen atmosphere. The flow rate of the gas may be performed at 1,000 ml/min/kg or less, preferably 500 ml/min/kg or less.

The primary pitch having a softening point of 50° C. to 200° C. is obtained through the thermal polymerization reaction, and at this time, the phase of the pitch is isotropic, or may be a mixed form in which an anisotropic phase is mixed in the isotropic within 40%.

(3) Grinding and Classifying

Before a solvent extraction step, the primary pitch obtained through thermal polymerization may be ground to increase the solvent extraction efficiency to be classified to a certain size or less. The grinding method used at this time may be any method, such as a ball mill or a grinder, and the particle size to be filtered is 500 μm or less, preferably 250 μm or less. When the particle size is 500 μm or more, the solvent extraction efficiency may be lowered.

(4) Solvent Extraction

The solvent extraction step is a step for removing non-mesogen components (components that interferes with the formation of the anisotropic phase) in the pitch, in which by mixing the primary pitch obtained through thermal polymerization and an organic solvent, the non-mesogen components are dissolved in the solvent to remove the components.

The formation of the anisotropic phase is made due to a stacking phenomenon of components called mesogen, and molecules capable of serving as the mesogen are polycyclic aromatic compounds, which have a two-dimensional plate structure to enable stable molecular stacking.

On the other hand, the non-mesogen component has a small molecular weight and low aromaticity and serves as a solvent of suppressing the stacking mesogen molecules by coordinating the mesogen molecules instead of forming a stacking structure, thereby interfere with the formation of the anisotropic phase.

However, a small amount of non-mesogen facilitates the movement of mesogen molecules to promote the formation of the anisotropic phase instead of suppressing the stacking, and may exhibit a positive effect of lowering the softening point of the pitch. When the non-mesogen component is completely removed, the formation of the anisotropic phase is enabled, but the energy required for phase transition is increased, and the softening point of the obtained anisotropic pitch is also excessively increased, and as a result, the obtained anisotropic pitch cannot be used for carbon fiber.

Therefore, the optimum solvent selection for solvent extraction is very important, and the present inventors found an optimal solvent and an optimal ratio of mesogen to non-mesogen for the solvent extraction to be presented in the present disclosure.

The solvent used for solvent extraction is acetone, and the pitch and the solvent are mixed at a ratio of 1:5 to 1:50, preferably 1:10 to 1:20 and then stirred at a temperature of room temperature to below 56° C. (boiling point of acetone) for a predetermined time. The mixing time may be 5 minutes to 2 hours, and an auxiliary means such as ultrasonic waves may be used to increase the stirring effect.

(5) Filtering and Drying

After the solvent extraction, vacuum filtration is performed to remove the solvent and the non-mesogen components dissolved in the solvent, and the vacuum filtration methods generally use methods widely used in organic chemistry experiments. After filtration, the same solvent as the solvent used for extraction flows a few times to completely wash the residual components.

Thereafter, the solvent insoluble remaining in the filter is recovered and dried sufficiently at a temperature higher than the boiling point of the solvent used for extraction. The drying temperature and method are not particularly limited, but it is preferable that the drying is performed at a temperature of 40° C. lower than a pitch softening point to prevent the melting of the pitch during drying.

A material obtained after completion of the drying may be an isotropic pitch consisting of a large amount of mesogen component and a small amount of non-mesogen component, and the softening point is higher than before the extraction, and may have a value of 220° C. to 330° C.

Thereafter, in order to form an anisotropic pitch of high purity through phase transition heat-treatment, the molecular weight distribution of the pitch immediately after the extraction is very important, and it is most suitable that the non-mesogen fraction determined in the molecular weight distribution is 5% to 15%, and the mesogen fraction is 95% to 85%.

The ratio of the mesogen and the non-mesogen may be determined based on the value of the molecular weight distribution obtained through MALDI-TOF-MS analysis. In a molecular weight distribution graph, total components are defined to 200 g/mol to 2,000 g/mol, and among them, the non-mesogen component is defined to 200 g/mol to 400 g/mol and the mesogen component is defined to 400 g/mol to 2,000 g/mol.

Each of the integral values of the non-mesogen section and the integral values of the mesogen section is divided by the integral value of the entire region (200 to 2,000 g/mol) and expressed as a percentage to determine a ratio.

(6) Phase Transition Heat-Treatment

The pitch obtained through the solvent extraction is heated to change the phase from isotropic to anisotropic. The step is performed under an inert atmosphere to suppress the reaction with oxygen, and in order to suppress additional pyrolysis or thermal polymerization reaction and induce only the phase transition, the temperature rises to a target temperature and then the pitch is heat-treated only for a very short time within 10 minutes, and then quenched to a temperature of a softening point or less or room temperature.

The gas used for forming the inert atmosphere may be performed using gas selected from the group consisting of nitrogen, argon, and helium in the same manner as in the thermal polymerization step.

The temperature for phase transition heat-treatment should be a temperature of the softening point or more of the pitch after extraction, and the upper limit may be limited to 450° C. for suppressing excessive pyrolysis reaction.

The heat-treatment time is suitably within 30 minutes after the target temperature reaches, preferably within 10 minutes. In the case of heat-treatment for a long time of more than 30 minutes, the softening point may be excessively increased, and the coke as infusible particles may be formed by causing an overreaction.

Stirring may be performed to increase heat transfer efficiency and obtain a uniform result, and there is no particular limitation thereto.

A second embodiment of the present disclosure relates to an anisotropic pitch prepared by the method according to the first embodiment.

The softening point of the anisotropic pitch according to the second embodiment may be 330° C. or lower, preferably 250° C. to 330° C., more preferably 300° C. to 330° C.

The anisotropic content of the anisotropic pitch according to the second embodiment may be 80% to 100%, preferably 85% to 100%, and more preferably 90% to 100%.

A third embodiment of the present disclosure relates to a carbon material including the anisotropic pitch according to the second embodiment.

The carbon material may be a carbon fiber or an anode material for a lithium secondary battery, preferably a precursor of the carbon fiber or a precursor of the anode material for the lithium secondary battery, but is not limited thereto. It is possible to expand the utilization area to the parts/materials of finished products such as aerospace, steel making, nuclear power generation, and mechanical components.

The carbon fiber is a material in a thread form, which is made of a carbon component as it is, and usually, is made by forming a petrochemical product called polyacrylonitrile (PAN) or a petroleum residue pitch as a raw material in a thread form and then carbonizing the thread form.

The demand of the carbon fiber has recently been recessed with global economic downturn, but thanks to the increase in demand such as high strength and lightweight composite materials for automobile, aircraft and wind power generation, it is expected that a high increase in demand in the medium and long term will be continued.

Generally, the lithium secondary battery is prepared by using a material capable of intercalation/deintercalation or alloying/dealloying of lithium ions as an anode and a cathode and charging an organic electrolyte or a polymer electrolyte between the anode and the cathode and electrical energy is generated by oxidation reaction and reduction reaction when the lithium ions are intercalated and deintercalated in the cathode and the anode.

Since the performance of the anode material of the lithium ion secondary battery has a large effect on the characteristics of the lithium ion secondary battery, an electrode active material constituting the anode material of the lithium secondary battery is important. Accordingly, the anisotropic pitch of the present disclosure may be used as a precursor of the anode material of the lithium ion secondary battery.

Hereinafter, the present disclosure will be described in detail by Examples and Experimental Examples. However, the following Examples and Experimental Examples are just illustrative of the present disclosure, and the contents of the present disclosure are not limited to the following Examples and Experimental Examples.

Example 1

(1) Thermal Polymerization

FCC-DO was used as a raw material, and heated to 430° C. at a rate of 3° C./min, and then maintained at the corresponding temperature for 8 hours and thermal polymerization was performed. Mechanical stirring was performed for uniform reaction and a stirring rate was 200 rpm.

Figure 2:
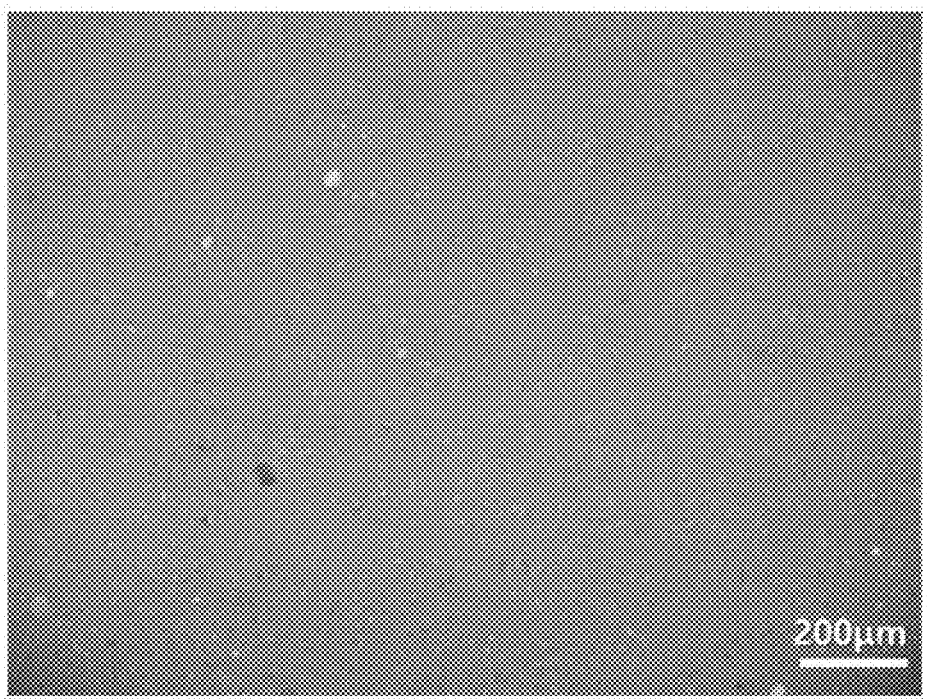
FIG. 2 is a polarized microscopic image showing a microstructure of an isotropic pitch prepared according to an embodiment of the present disclosure.

A softening point of the pitch obtained through thermal polymerization was 92° C., and as a result of observing a microstructure through a polarizing microscope, an isotropic base was shown, and about 5% of mesocarbon microbeads (MCMBs) were partially observed. The corresponding polarized microscopic images were shown in FIG. 2.

(2) Grinding and Classifying

The pitch was ground using a ball mill for solvent extraction and classified to a size of 250 μm or less.

(3) Solvent Extraction

For solvent extraction, the classified pitch powder was mixed with acetone at a weight ratio of 1:10, and stirred at room temperature for 1 hour.

(4) Filtering and Drying

Thereafter, in order to recover the pitch component that was not dissolved in acetone, reduced pressure filtration was performed, and the filtered infusible particles were placed in a convection oven at 60° C. and dried for 12 hours. The softening point of the pitch recovered after drying was 290° C.

(5) Phase Transition Heat-Treatment

For the phase transition, the acetone infusible pitch was heated to 290° C. at a rate of 5° C./min, and then it was checked that the pitch was dissolved, and then stirring started. Thereafter, the pitch was heated to 400° C. at the same rate and then maintained at the corresponding temperature for 10 minutes, and quenched to room temperature.

Figure 3:
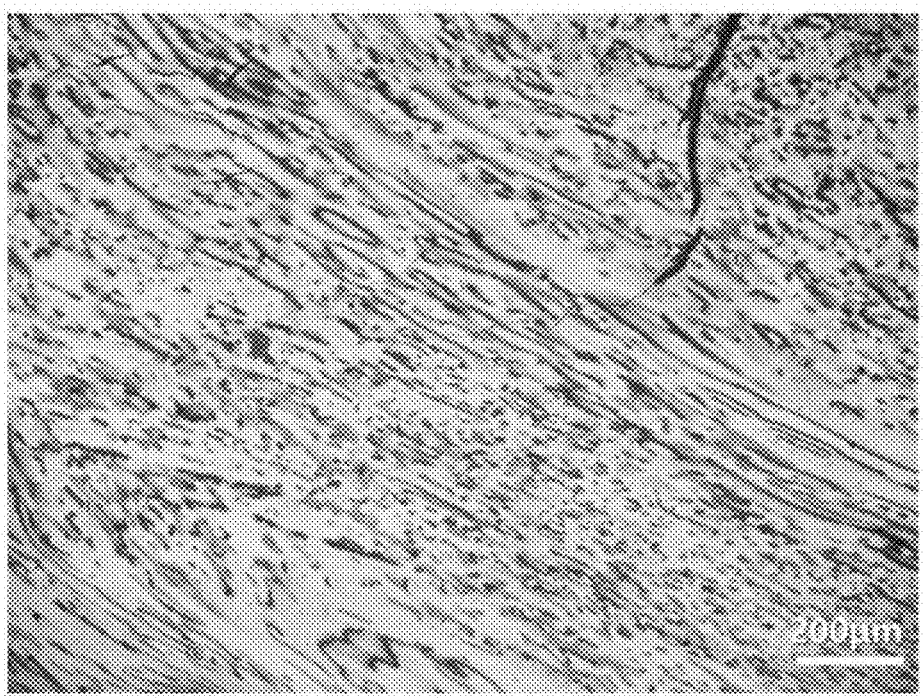
FIG. 3 is a polarized microscopic image showing a microstructure of an anisotropic pitch prepared according to Example 1 of the present disclosure.

The softening point of the finally obtained pitch was 330° C., and the anisotropic content of 100% was shown as the structure observation result. The corresponding structure image was shown in FIG. 3.

Example 2

The pitch subjected to filtering/drying after extraction in Example 1 was subjected to phase transition heat-treatment by varying a temperature. The heat-treatment temperature at this time was 380° C., and the pitch was heated to 290° C. at a rate of 5° C./min, and then it was checked that the pitch was dissolved, and then stirring started. Thereafter, the pitch was immediately heated to 390° C. and then maintained at the corresponding temperature for 10 minutes, and quenched to room temperature.

Figure 4:
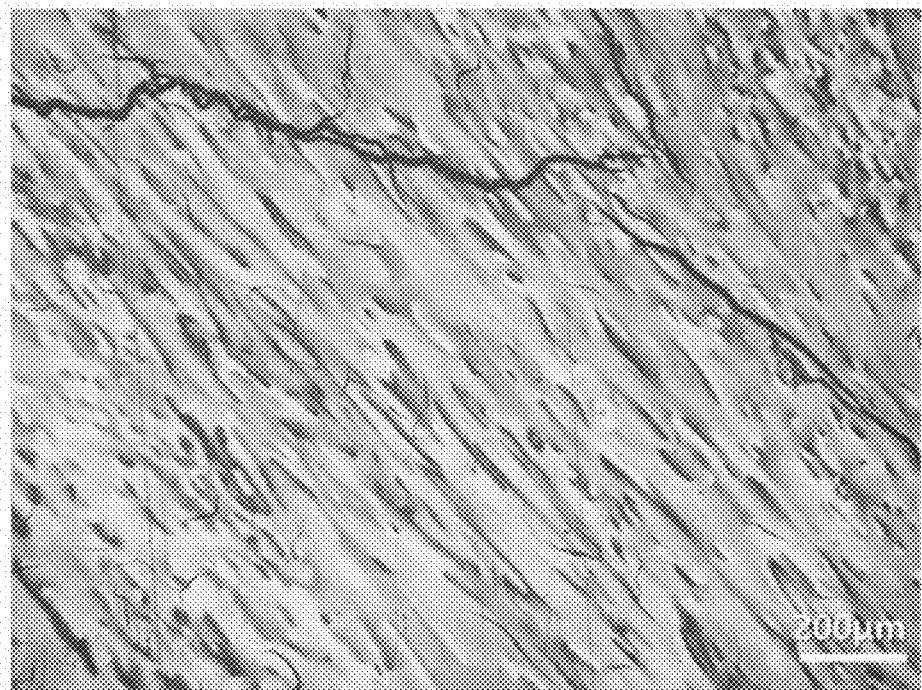
FIG. 4 is a polarized microscopic image showing a microstructure of an anisotropic pitch prepared according to Example 2 of the present disclosure.

The softening point of the finally obtained pitch was 313.8° C., and the anisotropic content of 100% was shown as the structure observation result. The corresponding structure image was shown in FIG. 4.

Example 3

The pitch subjected to filtering/drying after extraction in Example 1 was subjected to phase transition heat-treatment by varying a temperature. The heat-treatment temperature at this time was 360° C., and the pitch was heated to 290° C. at a rate of 5° C./min, and then it was checked that the pitch was dissolved, and then stirring started. Thereafter, the pitch was heated to 380° C. and then maintained at the corresponding temperature for 10 minutes, and quenched to room temperature.

Figure 5:
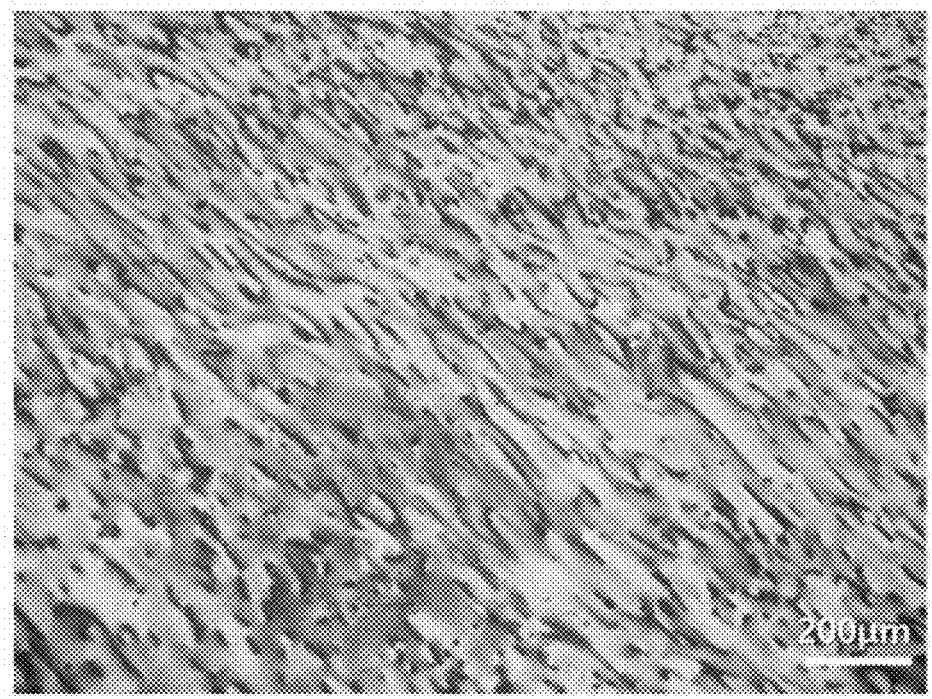
FIG. 5 is a polarized microscopic image showing a microstructure of an anisotropic pitch prepared according to Example 3 of the present disclosure.

The softening point of the finally obtained pitch was 311.5° C., and the anisotropic content of 100% was shown as the structure observation result. The corresponding structure image was shown in FIG. 5.

Example 4

The pitch subjected to filtering/drying after extraction in Example 1 was subjected to phase transition heat-treatment by varying a temperature. The heat-treatment temperature at this time was 360° C., and the pitch was heated to 290° C. at a rate of 5° C./min, and then it was checked that the pitch was dissolved, and then stirring started. Thereafter, the pitch was heated to 360° C. and then maintained at the corresponding temperature for 10 minutes, and quenched to room temperature.

Figure 6:
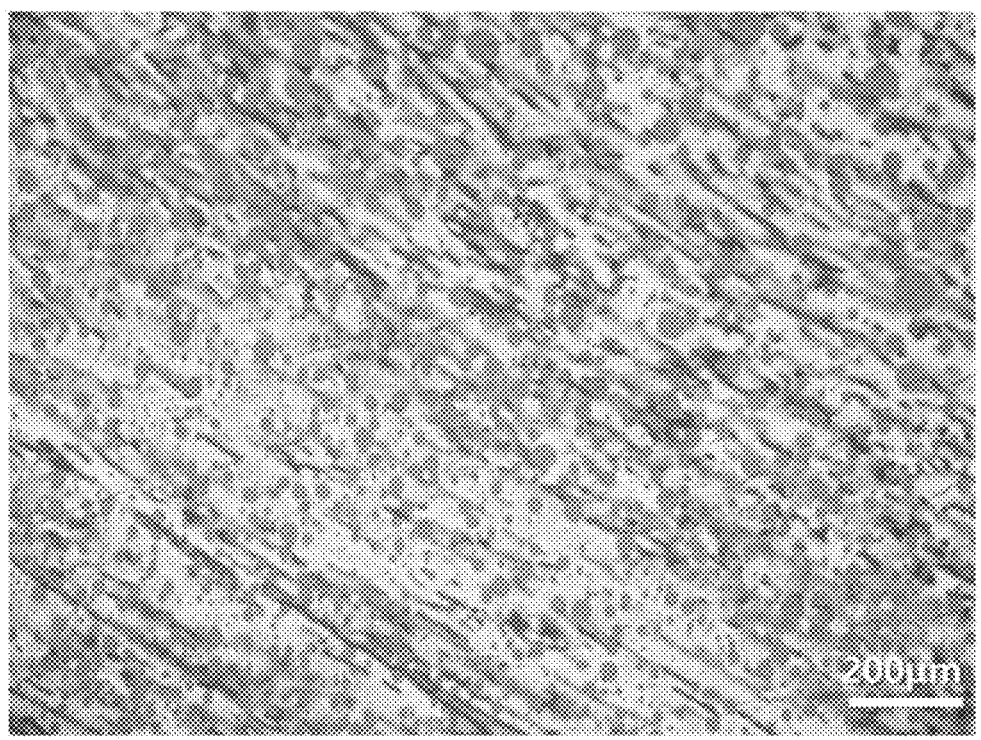
FIG. 6 is a polarized microscopic image showing a microstructure of an anisotropic pitch prepared according to Example 4 of the present disclosure.

The softening point of the finally obtained pitch was 309.1° C., and the anisotropic content of 85% was shown as the structure observation result. The corresponding structure image was shown in FIG. 6.

Comparative Example 1 (Extraction Solvent:Methanol)

(1) Solvent Extraction

The pitch powder subjected to grinding/classifying after thermal polymerization in Example 1 was mixed with methanol at a weight ratio of 1:10, and stirred at room temperature for 1 hour.

(2) Filtering and Drying

Thereafter, in order to recover the pitch component that was not dissolved in a solvent, reduced pressure filtration was performed, and the filtered infusible particles were placed in a convection oven at 70° C. and dried for 12 hours. The softening point of the pitch recovered after drying was 141.4° C.

(3) Phase Transition Heat-Treatment

For phase transition, the infusible pitch was heated to 380° C. at a rate of 5° C./min and then maintained at the temperature for 10 minutes and quenched to room temperature. Stirring was not performed throughout the phase transition heat-treatment.

The softening point of the finally obtained pitch was 194.5° C., and the anisotropic content of 40% or less was shown.

Comparative Example 2 (Extraction Solvent:Ethanol)

(1) Solvent Extraction

The pitch powder subjected to grinding/classifying after thermal polymerization in Example 1 was mixed with ethanol at a weight ratio of 1:10, and stirred at room temperature for 1 hour.

(2) Filtering and Drying

Thereafter, in order to recover the pitch component that was not dissolved in a solvent, reduced pressure filtration was performed, and the filtered infusible particles were placed in a convection oven at 80° C. and dried for 12 hours. The softening point of the pitch recovered after drying was 162.8° C.

(3) Phase Transition Heat-Treatment

For phase transition, the infusible pitch was heated to 380° C. at a rate of 5° C./min and then maintained at the corresponding temperature for 10 minutes and quenched to room temperature. Stirring was not performed throughout the phase transition heat-treatment.

The softening point of the finally obtained pitch was 203.0° C., and the anisotropic content of 40% or less was shown.

Comparative Example 3 (Extraction Solvent:Benzene)

(1) Solvent extraction

The pitch powder subjected to grinding/classifying after thermal polymerization in Example 1 was mixed with benzene at a weight ratio of 1:10, and stirred at room temperature for 1 hour.

(2) Filtering and Drying

Thereafter, in order to recover the pitch component that was not dissolved in a solvent, reduced pressure filtration was performed, and the filtered infusible particles were placed in a convection oven at 90° C. and dried for 12 hours. The softening point of the pitch recovered after drying was 350° C.

(3) Phase Transition Heat-Treatment

For phase transition, the infusible pitch was heated to 380° C. at a rate of 5° C./min and then maintained at the corresponding temperature for 10 minutes and quenched to room temperature. Stirring was not performed throughout the phase transition heat-treatment.

The anisotropic content of the finally obtained pitch was 100%, but the softening point was excessively high to 350° C. or higher and it was impossible to be used as the pitch.

Experimental Example (Analysis of Molecular Weight Distribution Through MALDI-TOF-MS)

Figure 7:
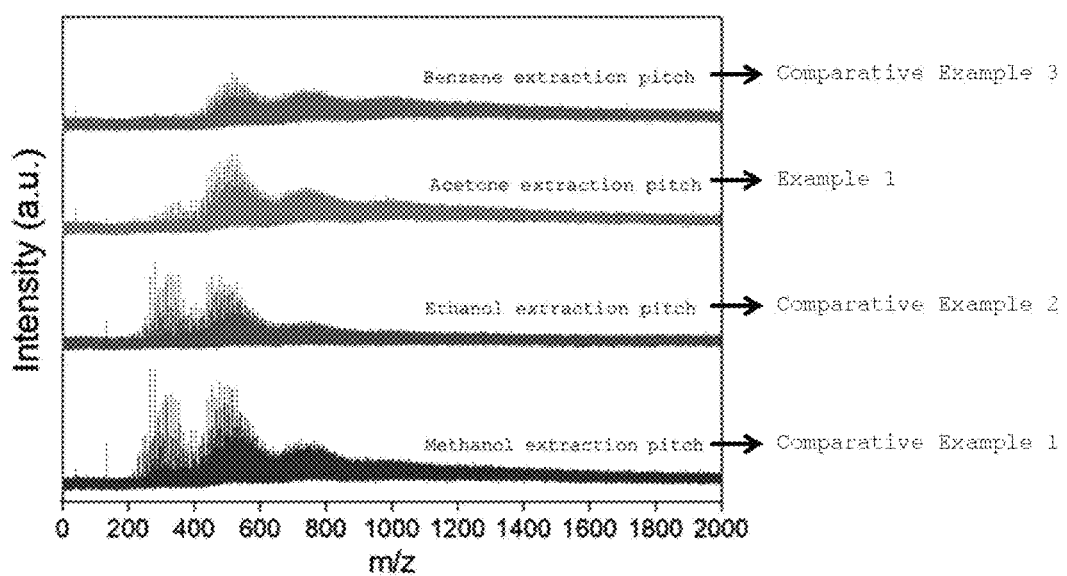
FIG. 7 is a graph showing measuring molecular weight distribution of pitches obtained after solvent extraction through a matrix-assisted laser desorption ionization time-of-flight mass spectrometer (MALDI-TOF-MS) according to an embodiment of the present disclosure.

The molecular weight distribution of the pitches (Example 1 and Comparative Examples 1, 2, and 3) obtained after solvent extraction was analyzed through a Matrix-Assisted Laser Desorption Ionization Time-of-Flight Mass Spectrometer (MALDI-TOF-MS) and the obtained distribution was shown in FIG. 7.

According to the present disclosure, it can be seen that the molecular weight distribution of the pitch obtained after the solvent extraction is located between 200 to 2,000 g/mol. In addition, the type of distribution varies according to the solvent used in extraction, and changes in the section of 200 to 400 g/mol were largely shown.

In the case of the pitch extracted by methanol, a high intensity signal in the section of 200 to 400 g/mol was shown, but the intensity of the corresponding section was weakened in order of ethanol, acetone, and benzene.

As shown in Examples 1 to 4 and Comparative Examples 1 to 3, the anisotropic content and the softening point of the final pitch are largely varied depending on an extraction solvent, and thus it can be seen that the result is due to a difference in molecular weight distribution of the pitch after extraction.

The components of the section of 200 to 400 g/mol are extracted by solvent extraction, and the corresponding section corresponds to a non-mesogen component that dissolves the mesogen component in the pitch or imparts fluidity thereto. In addition, the component of 400 g/mol or more corresponds to mesogen, which is a component forming an anisotropic phase.

The ratio of non-mesogen and mesogen plays a key role in making a pitch having a high anisotropic content and a low softening point.

The ratio of non-mesogen:mesogen was 3%:97% in the case of the benzene extraction pitch; 10%:90% in the case of the acetone extraction pitch; 45%:55% in the case of ethanol; and 42%:58% in the case of methanol.

So far, the specific embodiment relating to the method of preparing the heavy oil-derived anisotropic pitch for carbon fiber based on mesogen separation according to an embodiment of the present disclosure has been described, but it is obvious that many modifications are possible within the limit without departing from the scope of the present disclosure.

Therefore, the scope of the present disclosure should not be limited to the embodiments and should be defined by the appended claims and equivalents to the appended claims.

In other words, the embodiments described above are illustrative in all aspects and should be understood as not being restrictive, and the scope of the present disclosure is represented by appended claims to be described below rather than the detailed description, and it is to be interpreted that the meaning and scope of the appended claims and all changed or modified forms derived from the equivalents thereof are included within the scope of the present disclosure.

What is claimed is:

1. A method of preparing an anisotropic pitch for carbon fiber comprising the steps of:
   (a) obtaining a primary pitch by thermally polymerizing heavy oil;
   (b) grinding and classifying the primary pitch to provide a classified primary pitch;
   (c) solvent-extracting, filtering, and drying the classified primary pitch to adjust a ratio of mesogen to non-mesogen in the classified primary pitch to provide a dried pitch; and
   (d) converting the dried pitch concentrated with mesogenic components into an anisotropic pitch of mesophase through a secondary heat-treatment,
   wherein a softening point of the primary pitch obtained through the thermally polymerizing is 50° C. to 200° C., and an anisotropic content of the primary pitch is 40% or less, and
   wherein the heavy oil is at least one selected from the group consisting of fluidized catalytic cracking-slurry oil (FCC slurry oil), fluidized catalytic cracking-decant oil (FCC DO), pyrolysis fuel oil (PFO), ethylene bottom oil (EBO), and de-asphalted oil (DAO).

2. The method of preparing the anisotropic pitch for carbon fiber of claim 1, wherein the thermally polymerizing is performed under conditions of
   a reaction temperature of 350° C. to 500° C.,
   a reaction time of 10 minutes to 10 hours, and
   an inert gas flow rate of 1,000 ml/min/kg or less.

3. The method of preparing the anisotropic pitch for carbon fiber of claim 2, wherein the inert gas flow rate is 500 ml/min/kg or less.

4. The method of preparing the anisotropic pitch for carbon fiber of claim 1, wherein an average particle size of a ground product obtained by grinding in step (b) is 0.1 μm to 500 μm.

5. The method of preparing the anisotropic pitch for carbon fiber of claim 4, wherein the average particle size of the ground product is 1.0 μm to 250 μm.

6. The method of preparing the anisotropic pitch for carbon fiber of claim 1, wherein a solvent used in the solvent-extracting is acetone or a combination of acetone and an organic solvent except for the acetone.

7. The method of preparing the anisotropic pitch for carbon fiber of claim 1, wherein in the solvent-extracting, a weight ratio of the classified primary pitch to a solvent is 1:5 to 1:50.

8. The method of preparing the anisotropic pitch for carbon fiber of claim 7, wherein the weight ratio of the classified primary pitch to the solvent is 1:10 to 1:20.

9. The method of preparing the anisotropic pitch for carbon fiber of claim 1, wherein a molar ratio of mesogen to non-mesogen of the dried pitch of 80:20 to 95:5.

10. The method of preparing the anisotropic pitch for carbon fiber of claim 1, wherein the secondary heat-treatment is performed under conditions of a heat-treatment temperature of 300° C. to 450° C. and a heat-treatment time of 1 minute to 30minutes.

11. The method of preparing the anisotropic pitch for carbon fiber of claim 10, wherein the heat-treatment time is 1 minute to 10 minutes.

12. The method of preparing the anisotropic pitch for carbon fiber of claim 1, wherein a softening point of the anisotropic pitch obtained in step (d) is 330° C. or less.

13. The method of preparing the anisotropic pitch for carbon fiber of claim 1, wherein an anisotropic content of the anisotropic pitch obtained by step (d) is 80% to 100%.

* * * * *